United States Patent
Kurrasch et al.

(10) Patent No.: US 12,307,464 B2
(45) Date of Patent: May 20, 2025

(54) DETECTING CLONED PAYMENT CARDS

(71) Applicant: Bank of America Corporation, Charlotte, NC (US)

(72) Inventors: Peter Kurrasch, Palatine, IL (US); Joel Townsend, Spring Church, PA (US)

(73) Assignee: Bank of America Corporation, Charlotte, NC (US)

( * ) Notice: Subject to any disclaimer, the term of this patent is extended or adjusted under 35 U.S.C. 154(b) by 221 days.

(21) Appl. No.: 17/543,114

(22) Filed: Dec. 6, 2021

(65) Prior Publication Data

US 2023/0177511 A1    Jun. 8, 2023

(51) Int. Cl.
*G06Q 20/40* (2012.01)
*G06N 3/04* (2023.01)
*G06Q 20/34* (2012.01)
*G06Q 20/42* (2012.01)

(52) U.S. Cl.
CPC .......... *G06Q 20/4016* (2013.01); *G06N 3/04* (2013.01); *G06Q 20/353* (2013.01); *G06Q 20/4014* (2013.01); *G06Q 20/407* (2013.01); *G06Q 20/425* (2013.01)

(58) Field of Classification Search
CPC ............ G06Q 20/4016; G06Q 20/353; G06Q 20/4014; G06Q 20/407; G06Q 20/425; G06Q 20/18; G06Q 20/20; G06Q 20/34; G06N 3/04; G06N 3/0455; G07F 7/0813; G07F 7/0873
See application file for complete search history.

(56) References Cited

U.S. PATENT DOCUMENTS

| | | | |
|---|---|---|---|
| 8,256,667 B2 | 9/2012 | Poznansky et al. | |
| 8,474,700 B1* | 7/2013 | Lewis | G07F 19/20 235/483 |
| 2004/0169722 A1 | 9/2004 | Pena | |
| 2010/0097180 A1* | 4/2010 | Cardullo | G07F 7/1008 340/5.83 |
| 2013/0300850 A1 | 11/2013 | Millikan | |
| 2014/0162598 A1 | 6/2014 | Villa-Real | |

(Continued)

FOREIGN PATENT DOCUMENTS

| | | | |
|---|---|---|---|
| GB | 2510584 A | | 8/2014 |
| JP | 2020086856 A | * | 6/2020 |
| TR | 200903409 U | | 8/2009 |

OTHER PUBLICATIONS

Din, et al., Credit Card Fraud is a Computer Security Problem, from IEEE, 2021 (Year: 2021).

*Primary Examiner* — Patrick McAtee
*Assistant Examiner* — Vincent I Idiake
(74) *Attorney, Agent, or Firm* — Banner & Witcoff, Ltd.

(57) ABSTRACT

Aspects of the disclosure relate to a payment device to detect real-time suspicious payment cards. Prior to a transaction, a payment device detects suspicious payment cards based on captured images of the payment card. An alert may be generated upon detection of any suspicious or fraudulent payment card. In some arrangements, the payment device may utilize machine learning models or machine learning capabilities to detect suspicious payment cards. A characterization score may be generated and used to determine if a payment card is suspicious. The characterization scores may be updated based on different card issuer criteria and transaction use of each payment card.

20 Claims, 5 Drawing Sheets

(56) References Cited

U.S. PATENT DOCUMENTS

| | | | |
|---|---|---|---|
| 2014/0279096 A1* | 9/2014 | Akin | G06Q 20/405 |
| | | | 705/16 |
| 2015/0356401 A1 | 12/2015 | Vinyals et al. | |
| 2016/0162895 A1 | 6/2016 | Nuzum et al. | |
| 2017/0316415 A1* | 11/2017 | Gonzalez | G06Q 20/409 |
| 2019/0031272 A1 | 1/2019 | Kojika et al. | |
| 2020/0151719 A1* | 5/2020 | Sarin | G06Q 20/208 |
| 2022/0277311 A1 | 9/2022 | Hegedus et al. | |
| 2023/0043286 A1* | 2/2023 | Kumar | G06Q 20/4016 |
| 2023/0126764 A1* | 4/2023 | Ibrahim | G06N 20/10 |
| | | | 705/44 |
| 2023/0140190 A1* | 5/2023 | Jafri | G06Q 20/24 |
| | | | 705/44 |
| 2023/0368156 A1* | 11/2023 | Ledford | G06Q 20/4016 |

\* cited by examiner

DETECTING CLONED PAYMENT CARDS

BACKGROUND

Aspects of the disclosure relate to electrical computers, systems, and devices for detecting suspicious payment cards. Card reader devices may be found installed on gas pumps, vending machines, point-of-sale terminals, and even automatic teller machines (ATMs).

A frequent area of payment card fraud involves the use of cloned credit/debit payment cards, wherein a valid payment card number (and other data) is re-programmed into the magnetic stripe of another payment card. The other payment card may be a "blank" which is typically a white plastic payment card with no writing/images/graphics or it may be a valid payment card produced by a legitimate card issuer and simply re-programmed for fraudulent purposes. Once reprogrammed, a perpetrator may then use the cloned payment card to cash out available funds at an ATM or spend the funds using a point-of-sale terminal.

Current technologies do not attempt to examine the physical payment card in order to detect when a cloned payment card is being used so that fraudulent transactions may be blocked. Instead, fraud strategies usually rely on other payment attributes, like location, transaction amount, and merchant details. If something like a blank white card is used instead of a properly issued card there is nothing to determine its authenticity and block the transaction, or otherwise produce a suitable alert based on detection of a fraudulent payment card. There is a need to develop capability to detect suspicious payment cards at ATMs or point of sale interactions.

SUMMARY

In light of the foregoing background, the following presents a simplified summary of the present disclosure in order to provide a basic understanding of various aspects of the disclosure. The summary is not limiting with respect to the exemplary aspects of the disclosure described herein and is not an extensive overview of the disclosure. It is not intended to identify key or critical elements of or steps in the disclosure or to delineate the scope of the disclosure. Instead, as would be understood by a person of ordinary skill in the art, the following summary merely presents some concepts of the disclosure in simplified form as a prelude to the more detailed description provided below. Moreover, sufficient written descriptions of the embodiments of this application are disclosed in the specification throughout this application along with exemplary, non-exhaustive, and non-limiting manners and processes of making and using the inventions, in such full, clear, and concise, and exact terms in order to enable skilled artisans to make and use the inventions without undue experimentation and sets forth the best mode contemplated by the inventor for carrying out the inventions.

Aspects of this disclosure address one or more shortcomings in the industry by providing a payment device to detect real-time suspicious transactions using cloned payment cards. In some embodiments, the payment device includes on board circuitry and architecture to detect on the edge any proximate suspicious payment cards prior to initiating any transactions. In some arrangements, the payment device may utilize machine learning models or machine learning capabilities to detect suspicious payment cards or readers.

In accordance with one or more embodiments, a payment device may capture images of a payment card in contact with a payment device. The captured images may be analyzed to determine a suspicious payment card. An alert may be generated upon detection of any suspicious or fraudulent payment card.

In some embodiments, a characterization score may be generated and used to determine if a payment card is suspicious. The generated scores may be transmitted and shared by card issuers or financial institutions to prevent fraud. In a further embodiment, the generated scores may be updated based on new interactions with the payment card over time.

In an aspect of the disclosure, a computing environment may include one or more data centers and one or more computing devices, including computing devices located at or within such data centers and computing devices not located at or within such data centers. For example, a computing environment may include a first data center. The data center may include a card issuer computing platform. The computing environment may also include a user device, a point-of-sale terminal, and/or an ATM.

In some arrangements, a data center may be a distinct and physically separate data center operated by and/or otherwise associated with an organization, such as a financial institution. In addition, the data center may house a plurality of server computers and various other computers, network components, and devices.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is also noted that these connections are general and, unless specified otherwise, may be direct or indirect, wired or wireless, and that the specification is not intended to be limiting.

Figure 1:
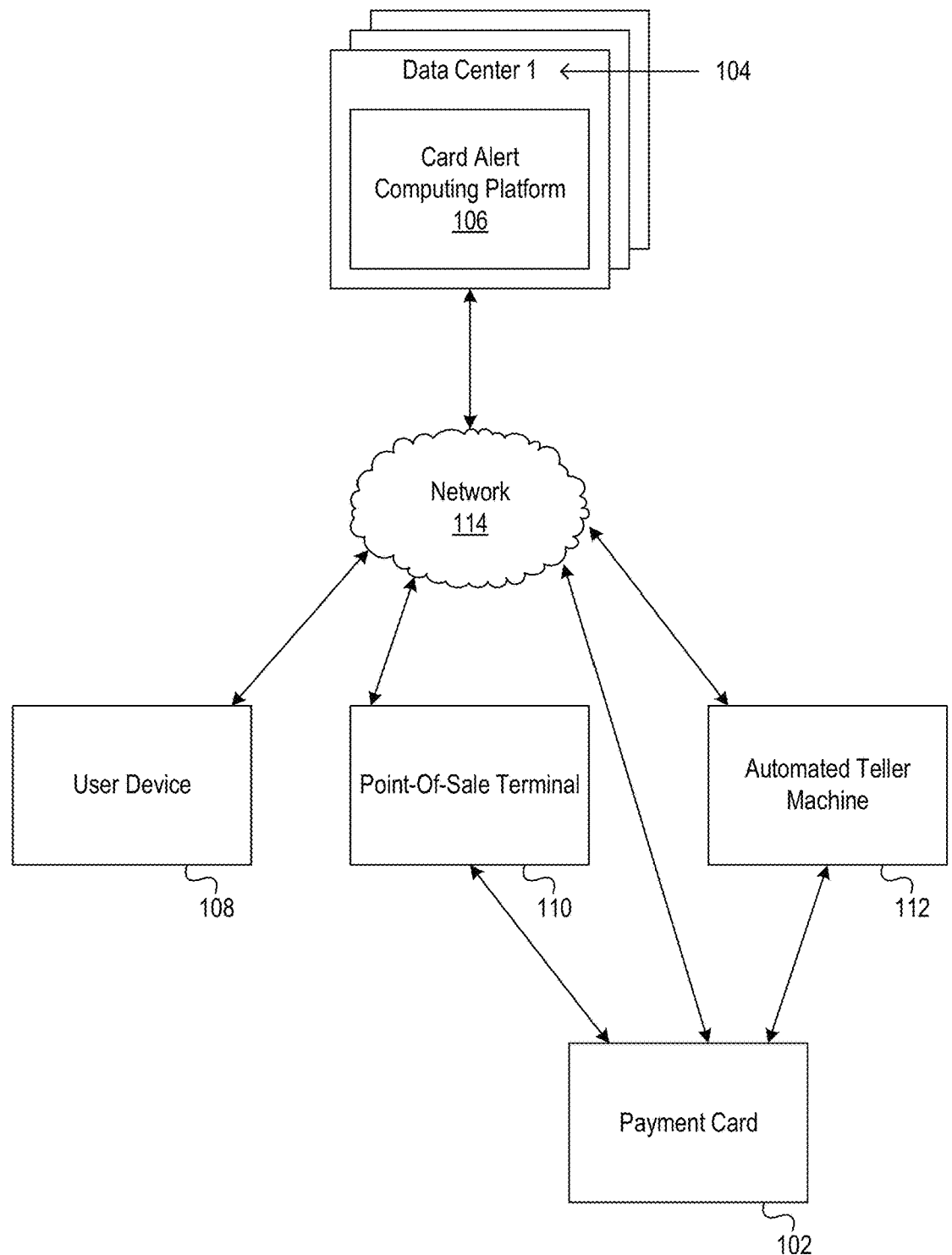
FIG. 1 illustrates a computing environment for detecting a suspicious card reader or fraudulent device in accordance with one or more aspects described herein.

FIG. 1 depicts an illustrative computing environment 100 for using a payment card 102 with various embodiments of the disclosure. In an embodiment, payment card 102 may include a smart contactless payment card. Computing environment 100 may include one or more data centers and one or more computing devices, including computing devices located at or within such data centers and computing devices not located at or within such data centers. For example, computing environment 100 may include a first data center 104. Data center 104 may include a card alert computing platform 106. Computing environment 100 also may include a user device 108, a point-of-sale terminal 110, and/or an automated teller machine 112.

Data center 104 may be a distinct and physically separate data center operated by and/or otherwise associated with an organization, such as a financial institution. In addition, data center 104 may house a plurality of server computers and various other computers, network components, and devices.

In an aspect of the disclosure, a card alert computing platform 106 may be configured to provide one or more portal interfaces to one or more client devices and/or may be configured to authenticate and/or monitor one or more payment cards and associated acceptance devices such as point-of-sale terminals, and/or automated teller machines.

In another aspect of the disclosure, card alert computing platform 106 may be configured to authenticate payment cards that transact with card readers. In some instances, a snapshot or digital images taken of a payment card 102 upon insertion into a card reader may be analyzed by card alert computing platform 106 for suspicious or fraudulent activity.

In some arrangements, data center 104 may include one or more client account servers, which may be configured to store and/or maintain information associated with one or more client accounts. For example, the client account server(s) may be configured to store and/or maintain information associated with one or more financial accounts associated with one or more customers of a financial institution, such as account balance information, transaction history information, and/or the like. In an embodiment, client account server(s) may store information regarding the background type and branding of customers issued payment cards. This information may also include digital images of a customers issued payment cards to be used for authentication purposes in real-time financial transactions.

Additionally or alternatively, client account server(s) may include and/or integrate with one or more client support servers and/or devices, such as one or more customer service representative devices used by one or more customer service representatives of an organization (which may, e.g., be a financial institution operating data center 106), to connect one or more customers of the organization with one or more customer service representatives of the organization via one or more telephone support sessions, chat support sessions, and/or other client support sessions. In an embodiment, the client support servers may maintain a history of transaction with various card readers for analysis. The analysis may include using machine-learning algorithms to look for suspicious activities associated with a particular reader or device. For instance, machine learning algorithms may recognize that a number of detected fraudulent payment cards are being used at a particular card reader. Such transaction may be halted and flagged for financial institution action.

In one or more arrangements, a user device 108 may be any type of computing device capable of receiving a user interface, receiving input via the user interface, and communicating the received input to one or more other computing devices. For example, a user device may, in some instances, be and/or include server computers, desktop computers, laptop computers, tablet computers, smart phones, or the like that may include one or more processors, memories, communication interfaces, storage devices, and/or other components. As noted above, and as illustrated in detail below, a user device may, in some instances, be one or more special-purpose computing devices configured to perform specific functions. In an embodiment, user device 108 may receive alerts or communications from card alert computing platform 106 regarding current or past transactions.

In an embodiment, user device 108 may communicate with card alert computing platform 106 to provide a user with information related to current or previous transactions. In some instances, in addition to being configured to provide uses with transactional information, card alert computing platform 106 also may be configured to provide a mobile banking portal associated with the financial institution to various customers of the financial institution and/or their associated mobile computing devices. Such portals may, for instance, provide customers of the financial institution with access to financial account information (e.g., account balance information, purchase transactions, account statements, recent transaction history information, or the like) and/or may provide customers of the financial institution with menus, controls, and/or other options to schedule and/or execute various transactions (e.g., online bill pay transactions, person-to-person funds transfer transactions, or the like). A card alert computing platform 106 may be configured to provide one or more interfaces that allow for configuration and management of one or more cards, computing devices, and/or computer systems included in the computing environment.

In an embodiment, a computing environment also may include one or more computing platforms. For example, a computing environment may include a card alert computing platform 106. As illustrated in greater detail below, a card alert computing platform 106 may include one or more computing devices configured to perform one or more of the functions described herein. For example, a card alert computing platform 106 may include one or more computers (e.g., laptop computers, desktop computers, servers, server blades, or the like). The computing environment also may include one or more networks 114, which may interconnect one or more of card alert computing platforms, a user device 108, a point-of-sale terminal 110, and/or an automated teller machine 112. For example, a computing environment may include a network 114, which may include one or more public networks, one or more private networks, and/or one or more sub-networks (e.g., local area networks (LANs), wide area networks (WANs), or the like).

The computing environment also may include one or more card interface devices, such as point-of-sale terminal 110 and/or ATM 112. A point-of-sale terminal 110 and/or an ATM 112 may include a card-reading interface, such as an EMV chip interface, an image capture device, a magnetic stripe reader, and/or a contactless reader (e.g., near-field communication (NFC), radio-frequency identification (RFID)). The one or more card interface devices, such as point-of-sale terminal 110 and/or automated teller machine 112, are connected to a power source. The one or more card interface devices, such as a point-of-sale terminal 110 and/or ATM 112, may be configured to send information to and receive information from the card alert computing platform 106. This may include, for example, card authentication information, image capture data, purchase information, and/or card update information (e.g., updated card number, expiration date, name, offers, or the like for display).

Figure 2:
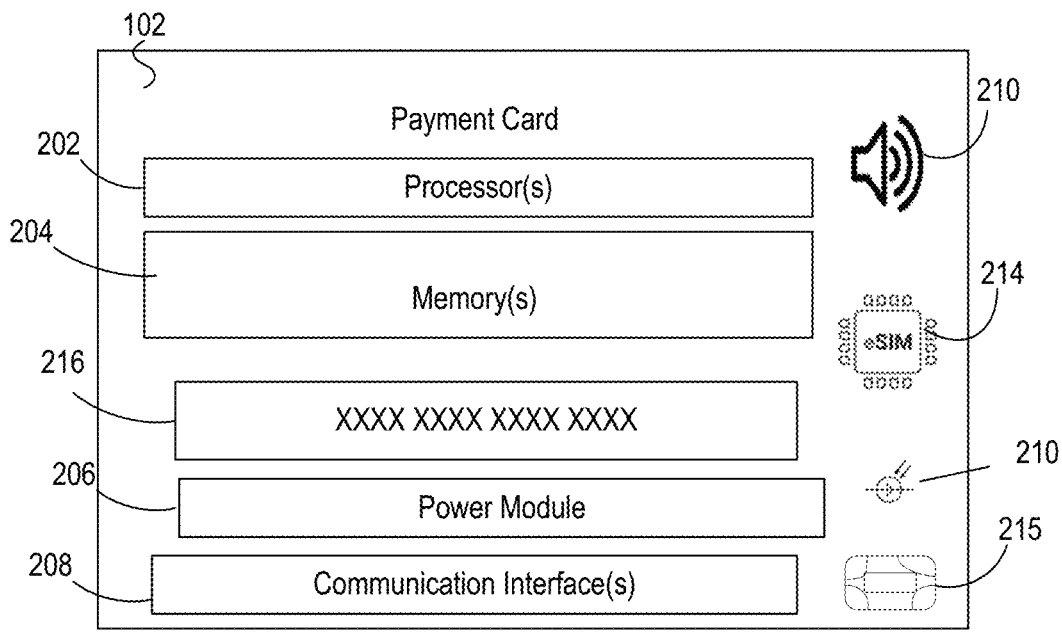
FIG. 2 illustrates a smart card in accordance with one or more aspects described herein.
Figure 2:
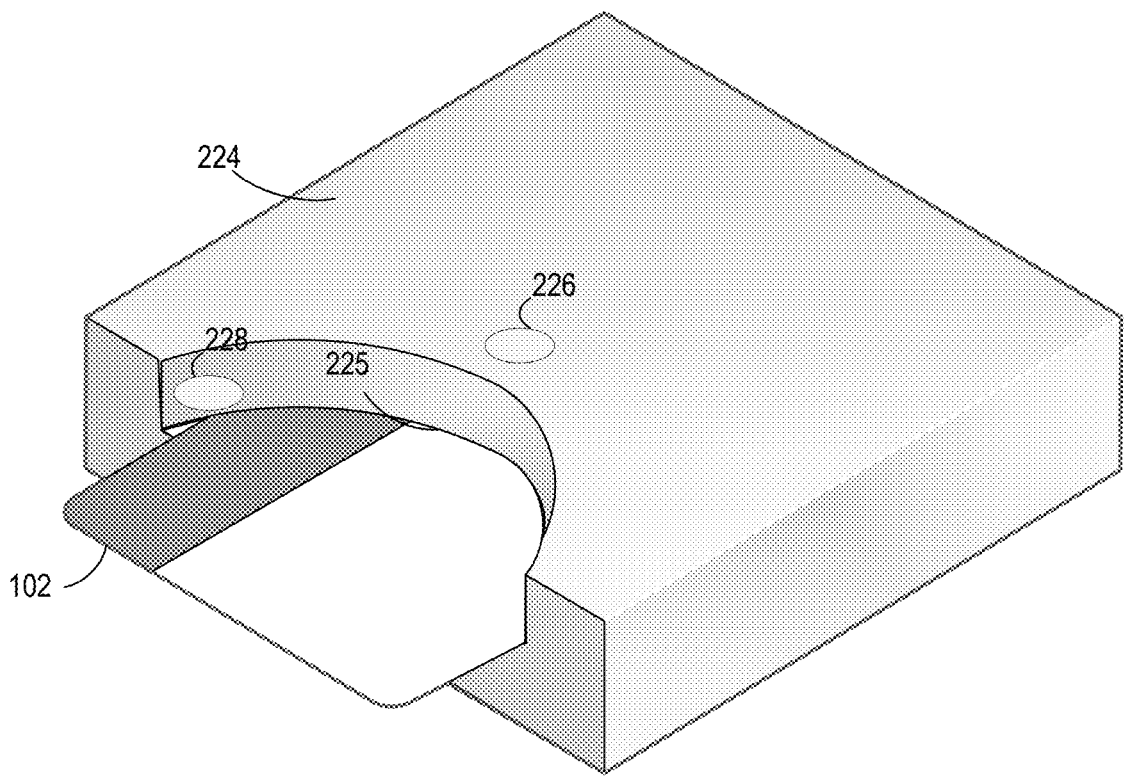

The computing environment may also include one or more smart contactless payment cards 102 (e.g., smart contactless credit cards, debit cards, ATM cards). As shown in FIG. 2, in some arrangements of the disclosure, a smart contactless card 102 may include magnetic stripe 201, one or more processors 202, memory 204, a power module 206, a communication interface 208, a speaker 210, a photovoltaic 212, and a micro-embedded eSIM 214. In an alternative embodiment, smart contactless payment card 102 may include a battery or similar power sources. In an embodiment, eSIM 214 may be used to pair with other smart contactless payment cards to form a card-pairing network to share information regarding suspicious card readers. The card-pairing network may also be connected with other backend networks associated with card alert computing platform 106.

In some arrangements a data bus may interconnect the one or more processors, memory, and communication interface. The communication interface may be a chip (e.g., an EMV chip) configured to support communication between smart contactless payment card and an interface device (e.g., an EMV chip reader of a point-of-sale terminal or automated teller machine). The chip may be configured to draw power (e.g., electrical current) from the interface device when connected to the interface device. In some embodiments, the EMV chip may be configured according to ISO/IEC 7816 standard. In some other embodiments, the EMV chip may include a contactless chip, such as a contactless chip configured according to ISO/IEC 14443 standard.

Memory may include one or more program modules having instructions that when executed by processor cause the smart contactless card 102 to perform one or more functions described herein. In some instances, the one or more program modules may be stored by and/or maintained in different memory units of the smart contactless payment card. In some instances, the one or more program modules may be instantiated in custom chips or integrated circuits, such as a custom chip configured to perform set preprogrammed logic.

FIG. 2 illustrates a payment card interface device 224 that may be included in a point-of-sale terminal 110 and/or ATM 112. Payment card interface device 224 may accept a payment card 102 by inserting payment card 102 into a front slot 225 of payment card interface device 224. If the payment card 102 has an embedded chip, payment card 102 may remain in the payment card interface device 224 until transaction completion. Upon insertion of payment card 102, a digital image of payment card 102 may be captured by imaging sensor 226. Image sensor 226 may utilize visible light or in other embodiments infrared, or ultraviolet wavelengths. In some arrangements, the imaging sensor or sensors may capture multispectral images. Filters may be applied to the multispectral images to separate different detected wavelengths.

In an aspect of the disclosure, multiple image sensors may be embedded into payment card interface device 224 so that digital images of both sides of inserted payment cards may be captured. In additional embodiments, image sensors such as image sensor 228 may be placed on different internal and external surfaces of payment card interface device 224 to capture images of smart contactless payment cards or magnetic stripe payment cards. One skilled in the art will realize that numerous different designs of payment card interface devices exist and that image sensor device placement may be different in each of these designs in order to capture digital images of the utilized payment card.

Figure 3:
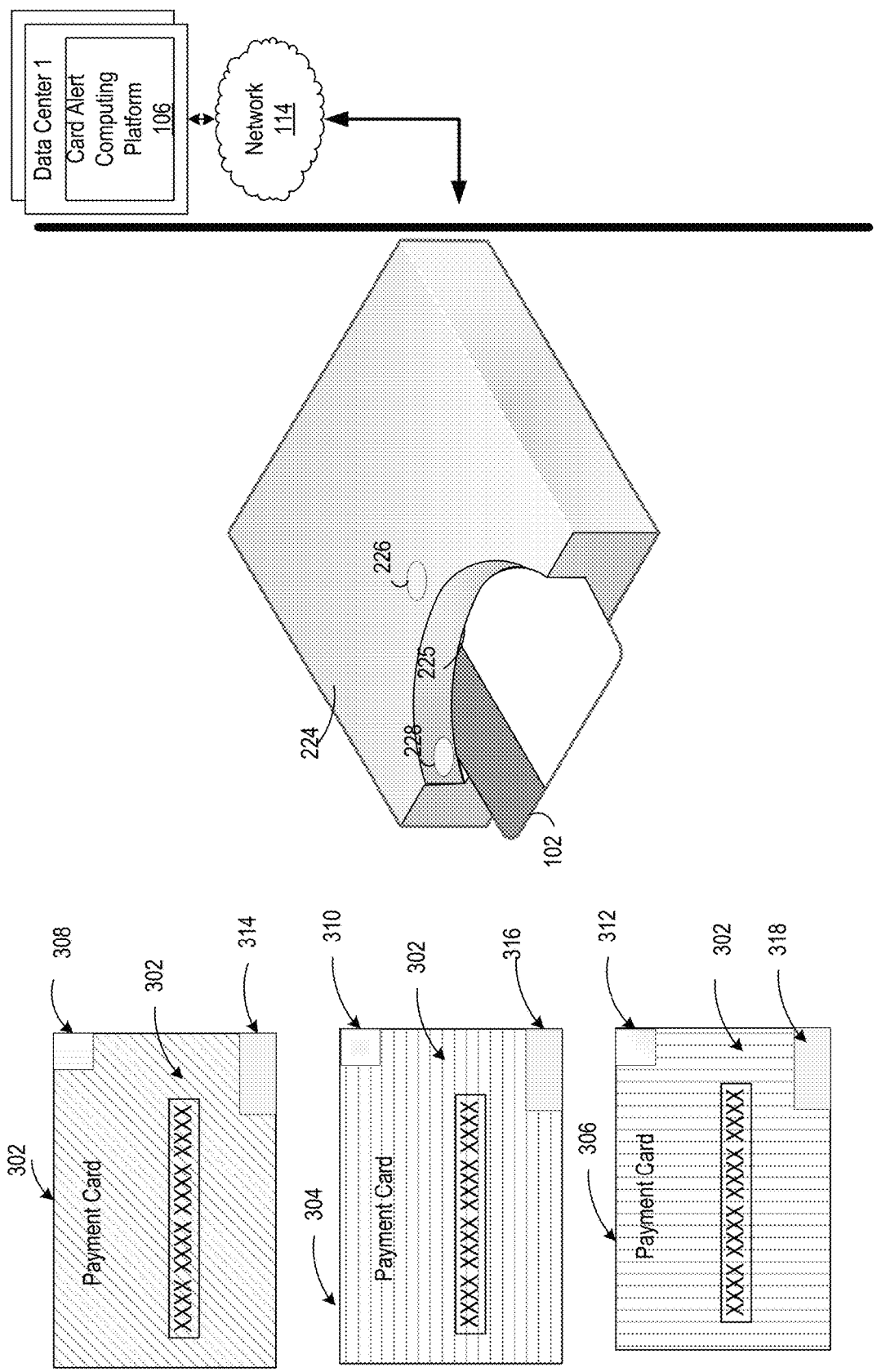
FIG. 3 illustrates exemplary payment card backgrounds that may be captured by image sensors in accordance with one or more aspects described herein.
Figure 4:
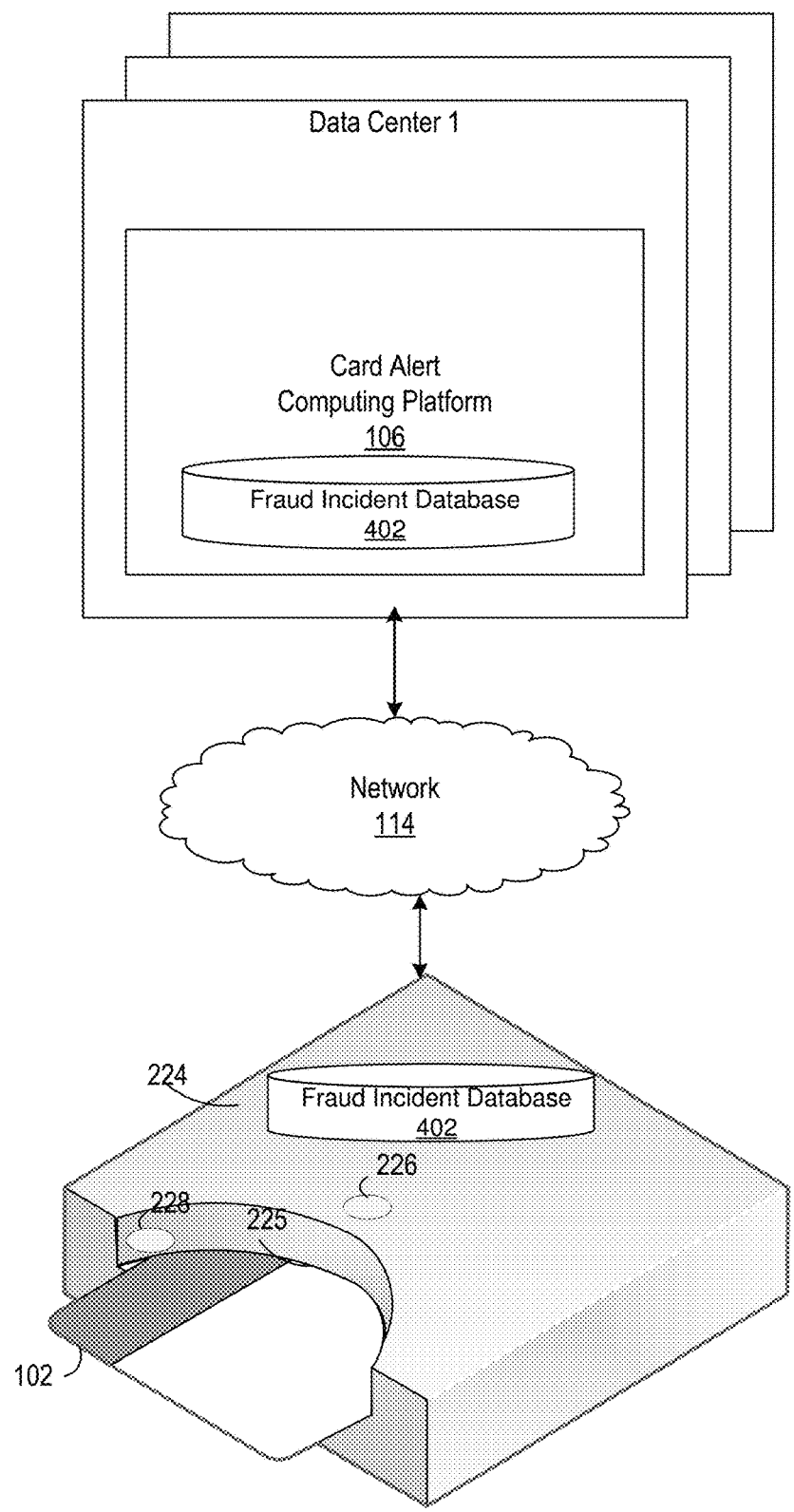
FIG. 4 illustrates generation and operation of a fraud incident database according to one or more aspects described herein.

FIG. 3 illustrates different exemplary payment card background designs in accordance with various aspects of the disclosure. In FIG. 3, payment cards 302, 304, and 306 each have different imprinted background designs that distinguish each of payment cards 302, 304, 306. In an aspect of the disclosure, the particular issuers of payment cards 302, 304, 306 have imprinted designs that distinguish their issued payment cards from different payment card issuers. The different background designs may include graphics, symbols, pictures, logos, colors or other image details that may be imprinted onto the physical payment card. In some arrangements, a payment card issuer may include a QR code or other information on a payment card that may not be decipherable or detectable to the human eye. Such information by be detected by various different sensors using different visible or non-viable light spectrums. In an embodiment, payment cards may include a particular area on each payment card in which payment card issuers may insert additional unique information detectable only by sensors to assist in identifying their payment cards from other card issuers and assist in detecting cloned cards.

In addition, on some payment cards the issuer's logo or other identifiable information may be displayed on the payment card such as in a corner of the cards as shown at 308, 310, and 312. Moreover, the financial network the card belongs to may also be indicated on the face of the card such as shown in the lower right hand corner of payment cards 302, 304, and 306, as boxes 314, 316, and 318.

In an aspect of the disclosure, the captured images may be analyzed to determine the bank identification number (bin) which includes the first six digits on a payment card. The bin may be used to identify the institution that has issued the payment card. In an embodiment, the determined bins may be used to determine from each issuer the universe of payment cards background designs that each institution uses for their payment cards.

In some embodiments, a customer may be able to design certain elements of the background of a payment card in order to personalize their payment card. In an aspect of the disclosure, a payment card issuer has approved the text or image details imprinted on their issued payment card and can readily identify the issuer of the payment card based on the background design.

In an aspect of the disclosure, when payment card 102 is inserted into payment card interface device 224, imaging sensor 226 detects and captures at least one digital image of payment card 102. The captured digital images may be used to analyze and characterize the inserted payment card 102. For instance, captured digital images may be used to determine if payment card 102 is an authentic payment card issued from a legitimate payment card issuer. The analysis of the captured images may include rating the payment card for normal wear-and-tear and discoloration based on the age of payment card 102.

In an embodiment, the analysis of the payment card from the captured images may determine the amount of red, green and/or blue color used in the overall payment card or in certain parts of the payment card. In an embodiment, the analysis detects or determines any unique features of different payment cards that may have been used by card issuers when designing their payment cards. These features may be used to detect legitimate payment cards. In yet another embodiment, card alert platform 106 may be used to compare the captured digital images and the information determined from the analysis to stored backgrounds for payment cards issued by payment card issuers. If the background or other features determined in the captured digital images does not match stored images of legitimate issued backgrounds and features from payment card issuers, the financial transaction may be canceled.

In an aspect of the disclosure, each payment card issuer may formulate different scenarios for determining and handling a detected cloned payment card. For instance, upon determination of a cloned payment card, a payment card issuer may want to immediately terminate the transaction and have the point-of-sale terminal 110 and/or ATM 112 confiscate the payment card if capable. For example, some ATM machines may be able to swallow a payment card based on detected fraudulent activity. In another embodiment, payment alert platform 106 may determine a characterization score for each inserted payment card. The characterization score may represent whether the inserted payment card falls within an acceptable parameter range. The acceptable parameter range may be determined by each payment card issuer and implemented by the system. The acceptable parameter range may be changed or updated by each payment card issuer to ensure that the presented payment card is a close enough match to the issued card at time of issuance to prevent fraudulent activity. In an embodiment, the generated characterization score may be used by an issuer to determine whether a payment card transaction should be terminated. The generated characterization score which may adjusted both up and down based on numerous factors may act as a fingerprint identifying the particular payment card.

As an example, if a white blank payment card with a reprogrammed magnetic stripe of another card is inserted into payment card interface device 224, imaging sensor 226 may detect the lack of a background on the inserted payment card. A comparison of the captured images by card alert computing platform 106 to stored characterized data about the inserted payment at time of issuance may determine if the inserted payment card is a cloned payment card. In an embodiment, a blank or an absent of color payment card may automatically indicate that a cloned payment card. In other embodiments, a series of white or blank cards inserted back-to-back in the same payment card interface device 224 may indicate fraudulent transactions, which may prompt denial of transactions or at least potentially prolonging transaction times to alert interested parties to the potential fraudulent activities taking place.

In an aspect of the disclosure, payment card interface device 224 utilizing imaging sensor 226 may capture images of a payment card's EMV chip. In an embodiment, payment card issuers may track the different types of EMV chips utilized in each of their different types of payment cards. The captured images of a payment card's EMV chip may be compared to stored information on the EMV chip embedded in payment card at card issuance. For example, the captured images may be used to determine the trace line patterns of the payment card's EMV chip 215 contact as depicted in FIG. 2 for comparison to the stored information about the EMV chip at time of issuance. If the trace patterns do match the stored information, the payment card interface device 224 may flag the payment card as being a cloned card.

In another embodiment, a characterization score may be determined by card alert platform 106 based on the captured images and additional information that may be stored regarding the inserted card to determine the characterization score for the inserted card. One skilled in the art will realize that the determination steps performed by card alert platform 106 may alternatively be performed by the point-of-sale terminal 110 and/or ATM 112 depending upon machine capabilities. In such embodiments, the information may be transmitted from the point-of-sale terminal 110 and/or ATM 112 to the payment card issuer using an ISO-8583 message for payment card processing.

In another aspect of the disclosure, a fraud incident database 402 may be located in card alert platform 402. Alternately, the fraud incident database 402 may also be stored in the card interface device 224 associated with the point-of-sale terminal 110 and/or ATM 112. The fraud incident database may store images of the captured data for payment interface device so as to compare the look or features of a payment card over time. For instance, a payment card's background may slowly deteriorate over time. The information may be used to assist with determining characterization of the payment card over time. For instance, the system may take into account payment card damage, scratches, discoloration, and normal wear-and-tear over a payment cards circulation time.

In another aspect of the disclosure, payment card captured images may be stored in the fraud incident database 402 at various frequencies to track the wear-and-tear of a payment card over time. These stored images may be used to compare a payment card's recent transaction payment card images to assist in detecting cloned cards.

In an embodiment, determined or extracted data may be compared and/or correlated with existing data found in fraud incident database 402. Fraud incident database 402 may include determined or reported instances of transaction fraud and associated locations and identification of card readers. In an embodiment, a fraud transaction history associated with a particular card reader may be maintained and used to determine new or reoccurring instances of transaction fraud. In an embodiment, if suspicious behavior is detected numerous entities may be alerted.

In some embodiments, artificial intelligence or machine learning may be used to determine suspicious payment cards and/or suspicious payment card readers. In some instances, a Long Short-Term Memory (LSTM) neural network may be used to correlate image data with instances of fraud. In other instances, deep scanning may be used to analyze relationship history and frequency of transactions on particular card readers. The use of machine learning and the analysis of payment card digital images may determine patterns of fraud occurring at particular payment card readers. In some embodiments, a vulnerability score may be determined and updated on a specified frequency.

In an embodiment, data center 104 may be a distinct and physically separate data center operated by and/or otherwise associated with an organization, such as a first financial institution. Other data centers may be operated at a different or second financial institution, which may wish to share data with the first financial institution regarding suspicious contactless card reader via a secure API or other secure interfaces to reduce incidents of fraud on both intuition's users.

Figure 5:
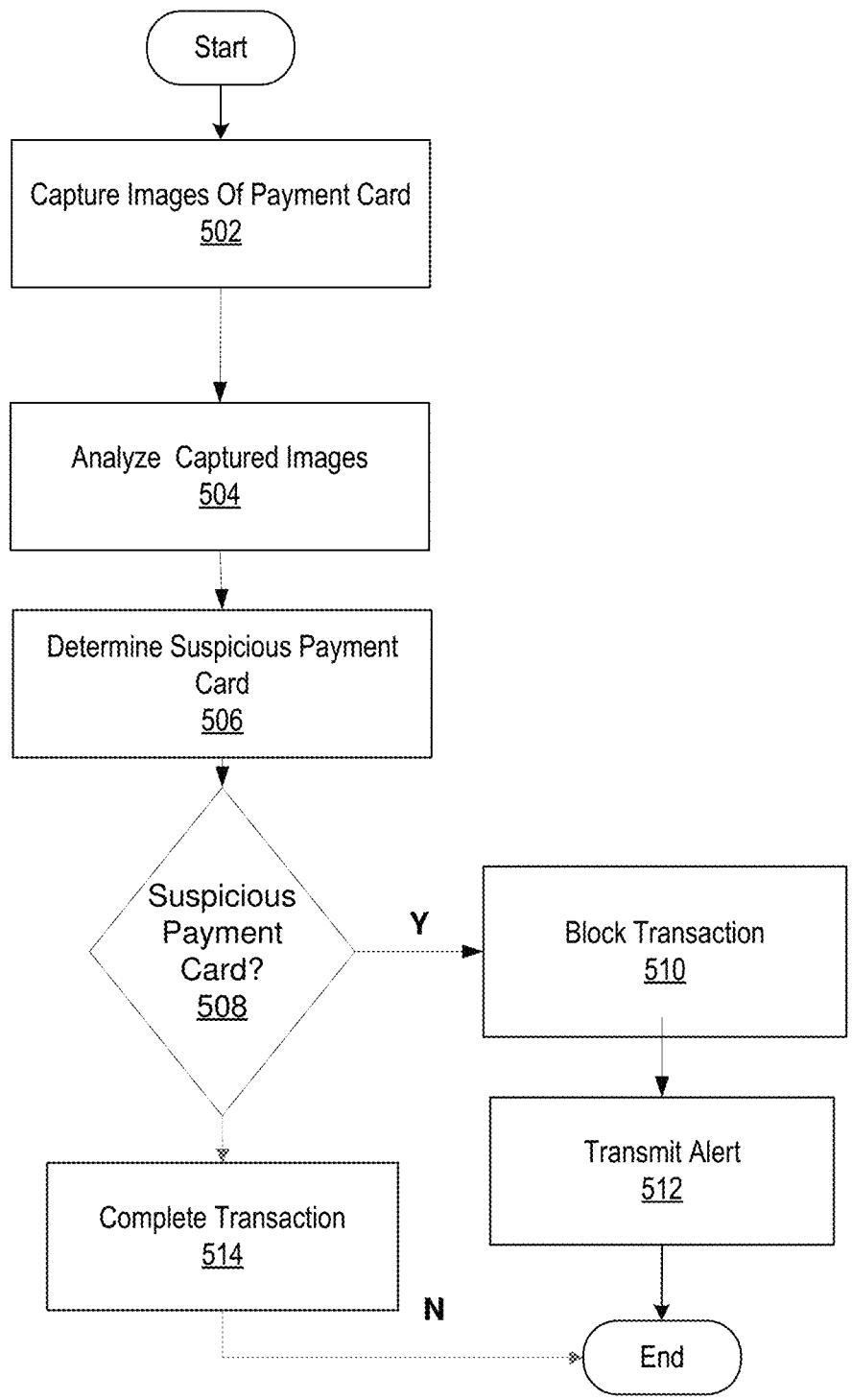
FIG. 5 depicts an illustrative block diagram for detecting a suspicious payment card in accordance with one or more aspects described herein.

FIG. 5 illustrates an exemplary method for detecting a suspicious payment card in accordance with one or more embodiments of the disclosure. Referring to FIG. 5, the process is initiated by bringing the payment card 102 within range of the card reader or payment card interface device 224. In an embodiment, a user may be attempting to purchase an item or service using their payment card 102.

At step 502, payment card interface device 224 captures at least one image of the payment card. In steps 504 and 506, payment card interface device 224 analyzes the at least one image and determines if the payment card 102 is suspicious before transaction authorization. In an embodiment, payment card interface device 224 captures images of the payment card using optical sensors 226. If in step 508, payment card 102 is determined to be suspicious then the transaction is blocked in step 510 and alerts are transmitted in step 512.

If in step 508, the payment card 102 is not determined to be suspicious then the process continues with normal payment processing techniques including card processing, card network processing, and transaction completion.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A payment device comprising:
    at least one processor; and
    memory storing computer-readable instructions that, when executed by the at least one processor, cause the payment device to:
    capture images of a payment card in contact with the payment device upon transaction initiation, wherein at least one of the captured images is a unique trace line pattern of an EMV chip contact of the payment card;
    analyze the captured images, wherein during analyzing the captured images, the unique trace line pattern of the EMV chip contact of the payment card is compared to a stored unique trace line pattern of the EMV chip contact of the payment card at a time of issuance;
    determine a suspicious payment card based on at least the analyzed captured images;
    block transaction of the payment card with the payment device based on the determination of the suspicious payment card; and
    transmit an alert indicating detection of the suspicious payment card.

2. The payment device of claim 1, wherein the computer-readable instructions, when executed by the at least one processor, cause the payment device to:
    determine an issuer of the payment card based on analysis of the captured images; and
    compare at least one feature of the captured images of the payment card to background images of issued payment cards by determined issuer.

3. The payment device of claim 1, wherein the computer-readable instructions, when executed by the at least one processor, cause the payment device to:
    update a fraud incident database with identification of the determined suspicious payment card and associated details of the blocked transaction.

4. The payment device of claim 3, wherein the computer-readable instructions, when executed by the at least one processor, cause the payment device to:
    correlate the blocked transaction of the payment card with information contained in the fraud incident database; and
    determine additional suspicious activity based on the correlation of the blocked transaction of the payment card with information contained in the fraud incident database, the determined suspicious activity associated with a point-of-sale terminal or an automated teller machine.

5. The payment device of claim 4, wherein a LSTM neural network correlates the blocked transaction of the payment card with information contained in the fraud incident database.

6. The payment device of claim 5, wherein the computer-readable instructions, when executed by the at least one processor, cause the payment device to:
    generate behavior patterns for the point-of-sale terminal or the automated teller machine based on information included in the fraud incident database; and
    determine additional suspicious payment card activity based on the generated behavior patterns for point-of-sale terminal or the automated teller machine.

7. The payment device of claim 1, wherein the captured images are multispectral images.

8. The payment device of claim 1, wherein the captured images include visible light images and ultra-violet light images.

9. The payment device of claim 1, wherein the computer-readable instructions, when executed by the at least one processor, cause the payment device to:
    generate a characterization score; and
    block transaction with the payment card based on the generated characterization score being at a predetermined level.

10. The payment device of claim 9, wherein the computer-readable instructions, when executed by the at least one processor, cause the payment card to:
    update the characterization score of the payment card based on payment card activity.

11. A method comprising:
    capturing images of a payment card in contact with a payment device upon transaction initiation wherein at least one of the captured images is a unique trace line pattern of an EMV chip contact of the payment card;
    analyzing the captured images, wherein during analyzing the captured images, the unique trace line pattern of the EMV chip contact of the payment card is compared to a unique stored trace line pattern of the EMV chip contact of the payment card at a time of issuance;
    determining a suspicious payment card based on at least the analyzed captured images;
    blocking transaction of the payment card with the payment device based on the determination of the suspicious payment card; and
    transmitting an alert indicating detection of the suspicious payment card.

12. The method of claim 11, further comprising:
    determining an issuer of the payment card based on analysis of the captured images; and
    comparing at least one feature of the captured images of the payment card to background images of issued payment cards by determined issuer.

13. The method of claim 11, further comprising updating a fraud incident database with identification of the determined suspicious payment card and associated details of the blocked transaction.

14. The method of claim 13, further comprising:
    correlating the blocked transaction of the payment card with information contained in the fraud incident database; and
    determining additional suspicious activity based on the correlation of the blocked transaction of the payment card with information contained in the fraud incident database, the determined suspicious activity associated with a point-of-sale terminal or an automated teller machine.

15. The method of claim 14, further comprising correlating with a LSTM neural network the blocked transaction of the payment card with information contained in the fraud incident database.

16. The method of claim 14 further comprising:
generating behavior patterns for the point-of-sale terminal or the automated teller machine; and
determining additional suspicious payment card activity based on the generated behavior patterns for the point-of-sale terminal or the automated teller machine.

17. A system comprising:
a payment card; and
a payment device comprising:
at least one processor; and
memory storing executable instructions that, when executed by the at least one processor, cause the payment device to:
scan the payment card using an optical sensor when the payment card is inserted into the payment device;
generate at least one scanned image of the payment card, wherein the at least one scanned image is a unique trace line pattern of an EMV chip contact of the payment card;
prior to initiating a transaction with the payment card, compare the at least one scanned image of the payment card to stored authenticated images of valid payment cards, wherein the unique trace line pattern of the EMV chip contact of the payment card is compared to a unique stored trace line pattern of the EMV chip contact of the payment card at a time of issuance;
determine a suspicious payment card based on the compared at least one scanned image to the stored authenticated images of valid payment cards;
block transaction of the payment card with the payment device based on the determination of a suspicious payment card; and
transmit an alert indicating detection of the suspicious payment card.

18. The system of claim 17, wherein the memory storing computer-readable instructions that, when executed by the at least one processor, cause the payment device to:
determine an issuer of the payment card based on analysis of the scanned images; and
compare at least one feature of the scanned images of the payment card to background images of issued payment cards by determined issuer.

19. The system of claim 18, wherein the at least one scanned image includes an ultra-violet light image.

20. The system of claim 17, wherein the memory storing computer-readable instructions, when executed by the at least one processor, cause the payment device to:
update a fraud incident database with identification of the determined suspicious payment card and associated details of the blocked transaction.

* * * * *